United States Patent
Wu et al.

(10) Patent No.: US 9,898,993 B2
(45) Date of Patent: Feb. 20, 2018

(54) METHOD FOR CONTROLLING MESSAGE SIGNAL WITHIN TIMING CONTROLLER INTEGRATED CIRCUIT, TIMING CONTROLLER INTEGRATED CIRCUIT AND DISPLAY PANEL

(71) Applicant: Shenzhen China Star Optoelectronics Technology Co., Ltd., Shenzhen, Guangdong (CN)

(72) Inventors: Jingjing Wu, Guangdong (CN); Zhi Xiong, Guangdong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 228 days.

(21) Appl. No.: 14/907,553

(22) PCT Filed: Dec. 28, 2015

(86) PCT No.: PCT/CN2015/099211
§ 371 (c)(1),
(2) Date: Jan. 25, 2016

(87) PCT Pub. No.: WO2017/088242
PCT Pub. Date: Jun. 1, 2017

(65) Prior Publication Data
US 2017/0287415 A1    Oct. 5, 2017

(30) Foreign Application Priority Data
Nov. 25, 2015   (CN) .......................... 2015 1 0837163

(51) Int. Cl.
*G09G 3/36* (2006.01)
*G06F 13/16* (2006.01)
(Continued)

(52) U.S. Cl.
CPC ....... *G09G 3/3696* (2013.01); *G06F 13/1694* (2013.01); *H04J 3/26* (2013.01);
(Continued)

(58) Field of Classification Search
CPC ............. G09G 2370/14; G09G 3/3696; G09G 2310/0243
See application file for complete search history.

(56) References Cited

U.S. PATENT DOCUMENTS 8,860,711 B2 * 10/2014 Kim ..................... G09G 3/3611
345/213
9,165,522 B2 * 10/2015 Ding .................... G09G 3/2011
(Continued)

FOREIGN PATENT DOCUMENTS

CN           101197114 A      6/2008
CN           101587690 A     11/2009
(Continued)

*Primary Examiner* — Patrick F Marinelli
(74) *Attorney, Agent, or Firm* — Andrew C. Cheng (57) ABSTRACT

The present disclosure provides method for controlling a message signal within a timing controller integrated circuit, the timing controller integrated circuit and a display panel. The method includes: receiving a low voltage differential signaling signal; decoding the low voltage differential signaling signal to obtain a transistor-transistor logic RGB data signal and a control signal, wherein the control signal comprises: a start signal, a horizontal synchronization and a vertical synchronization; processing the transistor-transistor logic RGB data signal to obtain an input RGB data; controlling a timing of the start signal before a timing of the input RGB data; and processing the input RGB data to obtain a mini-low voltage differential signaling data. Therefore, the technical scheme provided by the present disclosure has an advantage of the low cost.

8 Claims, 5 Drawing Sheets

(51) Int. Cl.
*H04Q 9/14* (2006.01)
*H04Q 11/04* (2006.01)
*H04J 3/26* (2006.01)

(52) U.S. Cl.
CPC ........... *H04Q 9/14* (2013.01); *H04Q 11/0428* (2013.01); *G09G 2310/0243* (2013.01); *G09G 2370/14* (2013.01)

(56) References Cited

U.S. PATENT DOCUMENTS

| | | | |
|---|---|---|---|
| 2009/0079683 A1* | 3/2009 | Ding | G09G 3/2011 345/89 |
| 2011/0234561 A1 | 9/2011 | Tzeng et al. | |
| 2012/0139895 A1* | 6/2012 | Kim | G09G 3/3611 345/213 |
| 2012/0236048 A1* | 9/2012 | Tseng | G09G 3/3614 345/691 |
| 2013/0050176 A1* | 2/2013 | Kim | G09G 3/36 345/214 |
| 2014/0168183 A1* | 6/2014 | Yang | G09G 3/3614 345/209 |
| 2014/0198086 A1 | 7/2014 | Cheng et al. | |
| 2016/0351147 A1* | 12/2016 | Zheng | G09G 3/3648 |
| 2017/0287415 A1* | 10/2017 | Wu | G09G 3/36 |

FOREIGN PATENT DOCUMENTS

| | | |
|---|---|---|
| CN | 102005199 A | 4/2011 |
| CN | 102436798 A | 5/2012 |
| CN | 102509538 A | 6/2012 |
| CN | 202352302 U | 7/2012 |
| CN | 103280205 A | 9/2013 |
| KR | 10-2013-0095574 A | 8/2013 |
| KR | 10-2014-0077406 A | 6/2014 |

* cited by examiner

METHOD FOR CONTROLLING MESSAGE SIGNAL WITHIN TIMING CONTROLLER INTEGRATED CIRCUIT, TIMING CONTROLLER INTEGRATED CIRCUIT AND DISPLAY PANEL

CROSS REFERENCE

This application claims the benefit of, and priority to, Chinese Patent Application No. 201510837163.X, filed Nov. 25, 2015, titled "method for controlling message signal within timing controller integrated circuit, timing controller integrated circuit and display panel", the entire contents of which are incorporated by reference herein in its entirety.

FIELD OF THE INVENTION

The disclosure is related to display technology field, and more particular to a method for controlling a message signal within a timing controller integrated circuit, the timing controller integrated circuit and a display panel.

BACKGROUND OF THE INVENTION

Figure 1:
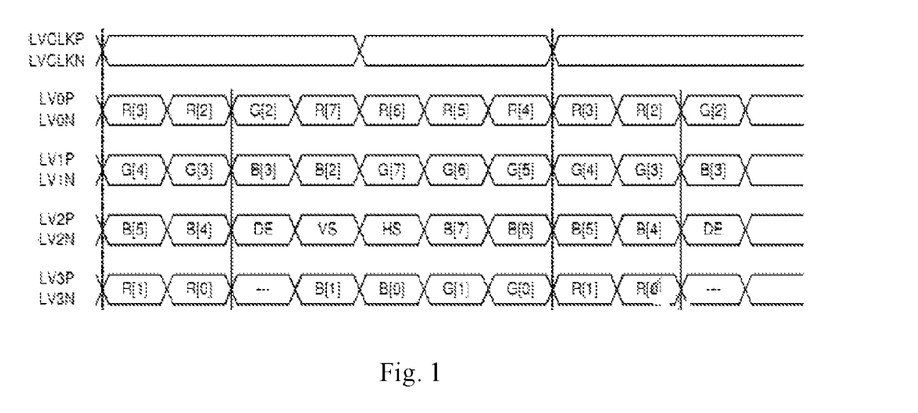
FIG. 1 is a schematic view of a signal arrangement manner in the prior art.

The liquid crystal panel, also known as the liquid crystal display (LCD), is an electronic display device which is commonly used currently. The digital signals outputted by the LED driver board include RGB data signals, and RGB means that three colors: red, green and blue, i.e. three primary colors usually defined by people, wherein R indicates red color, G indicates green color, and B indicates blue color. Besides of the RGB data signals, the digital signals outputted by the LED driver board further includes a horizontal synchronization (Hsync) signal, a vertical synchronization (Vsync) signal, a data enable (DE) signal, a pixel time signal, etc. For example, in the output of the low voltage differential signaling (LVDS) interface, each signal arrangement manner is shown in FIG. 1. The transmitting protocol defines two transmitting protocols: a data enable mode (DE mode) and a synchronization mode (Sync mode). The DE mode only needs synchronizing the RGB data through the DE signal, and the Sync mode need synchronizing the RGB data through the Hsync signal and the Vsync signal, wherein the relationship of the above timing is shown in FIG. 2.

In the implementation of the technical scheme in the existing technique, the following technical problems exist.

Figure 2:
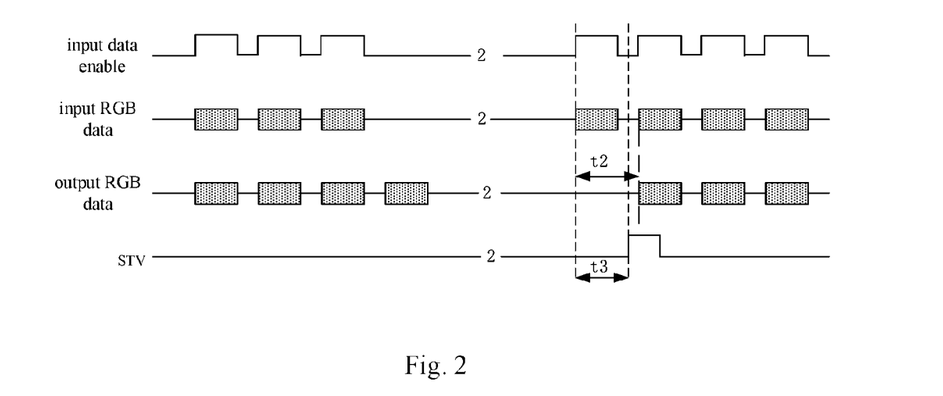
FIG. 2 is a schematic view of a signal timing within a timing controller integrated circuit in the prior art.

Please refers to FIG. 2, the two transmitting mode needs delaying a period of time for the data signals of one entire source line, wherein the data signal are stored in a line buffer of a timing controller integrated circuit (TCON IC). For example, for a panel with a resolution of 1920*1080/8 bit, a data quantity of each source line within the TCON IC is 1920*3*8 bit=46080 bits, and thus it needs the line buffer with a storage capacity of 46 kB to store the delayed data signals (the delayed data signal correspond to the output RGB signals in FIG. 2). Therefore, the TCON IC needs disposing the line buffer to store the delayed data signal, such that the cost of the TCON IC is higher.

SUMMARY OF THE INVENTION

A method for controlling a message signal within a timing controller integrated circuit is provide. The method for controlling the message signal within the timing controller integrated circuit controls the timing of the start signal (STV), such that the start timing of the STV is before the timing of the input RGB signal. Therefore, it does not need delaying for the input RGB data, thereby saving the line buffer and decreasing the cost.

A first aspect provides a method for controlling a message signal within a timing controller integrated circuit, and the method includes the following steps:

receiving a low voltage differential signaling signal;

decoding the low voltage differential signaling signal to obtain a transistor-transistor logic RGB data signal and a control signal, wherein the control signal includes: a start signal, a horizontal synchronization and a vertical synchronization;

processing the transistor-transistor logic RGB data signal to obtain an input RGB data;

controlling a timing of the start signal before a timing of the input RGB data; and processing the input RGB data to obtain a mini-low voltage differential signaling data.

Combined with the method for controlling the message signal within the timing controller integrated circuit provided by the first aspect, in a first optional scheme of the first aspect, before the step of controlling the timing of the start signal before a timing of the mini-low voltage differential signal data includes:

delaying a first set time t1 for the timing of the start signal based on a timing tVsync of the vertical synchronization, wherein tVsync+t1<tm, and tm is the timing of the input RGB data.

Combined with the method for controlling the message signal within the timing controller integrated circuit provided by the first aspect, in a second optional scheme of the first aspect, before the step of controlling the timing of the start signal before the timing of the input RGB data includes:

generating a reference signal, synchronizing the timing of the start signal and a timing of the reference signal, and controlling the timing treference of the reference signal to delay a second setting time tx based on a timing tVsync of the vertical synchronization, wherein tVsync+tx<tm, and tm is the timing of the input RGB data.

Combined with the method for controlling the message signal within the timing controller integrated circuit provided by the first aspect, the first optional scheme of the first aspect and the second optional scheme of the first aspect, in a third optional scheme of the first aspect, a mode of the low voltage differential signaling signal is:

a synchronization mode or an enabling mode.

A second aspect provides a timing controller integrated circuit, and the timing controller integrated circuit includes a low voltage differential signaling receiver, a mini-low voltage differential signaling output data mapping module, a transmitting module and a timing controller;

wherein the low voltage differential signaling receiver is used to receive a low voltage differential signaling signal, decode the low voltage differential signaling signal to obtain a transistor-transistor logic RGB data signal and a control signal, wherein the control signal includes: a start signal, a horizontal synchronization and a vertical synchronization, and transmit the transistor-transistor logic RGB data signal to the mini-low voltage differential signaling output data mapping module and transmit the control signal to the timing controller;

wherein the mini-low voltage differential signaling output data mapping module is used to process the transistor-transistor logic RGB data signal to obtain a input RGB data and transmits the input RGB data to the transmitting module;

wherein the timing controller is used to control a timing of the start signal before a timing of the input RGB data; and wherein the transmitting module is used to process the input RGB data to obtain a mini-low voltage differential signaling data.

Combined with the timing controller integrated circuit provided by the second aspect, in a first optional scheme of the second aspect, the timing controller is used to delay a first set time t1 for the timing of the start signal based on a timing tVsync of the vertical synchronization, wherein tVsync+t1<tm, and tm is the timing of the input RGB data.

Combined with the timing controller integrated circuit provided by the second aspect, in a second optional scheme of the second aspect, the timing controller is used to generate a reference signal, synchronize the timing of the start signal and a timing of the reference signal, and control the timing treference of the reference signal to delay a second set time tx based on a timing tVsync of the vertical synchronization, wherein tVsync+tx<tm, and tm is the timing of the input RGB data.

Combined with the timing controller integrated circuit provided by the second aspect, the first optional scheme of the second aspect and the second optional scheme of the second aspect, a mode of the low voltage differential signaling signal is:

a synchronization mode or an enabling mode.

A third aspect provides a display panel, and the display panel includes the timing controller integrated circuit provided by the second aspect, the first optional scheme of the second aspect, the second optional scheme of the second aspect and the third optional of the second aspect.

A fourth aspect provides a display device, and the display device includes the display panel provided by the third aspect.

According to a method for controlling a message signal within a timing controller integrated circuit, the timing controller integrated circuit and a display panel provided by each embodiment, the above embodiment controls the timing of the start signal (STV), such that the start timing of the STV is before the timing of the input RGB signal. Therefore, it does not need delaying for the input RGB data, thereby saving the line buffer and decreasing the cost.

BRIEF DESCRIPTION OF THE DRAWINGS

In order to more clearly illustrate the prior art or the embodiments or aspects of the practice of the disclosure, the accompanying drawings for illustrating the prior art or the embodiments of the disclosure are briefly described as below. It is apparently that the drawings described below are merely some embodiments of the disclosure, and those skilled in the art may derive other drawings according the drawings described below without creative endeavor.

DETAILED DESCRIPTION

The following description with reference to the accompanying drawings is provided to clearly and completely explain the exemplary embodiments of the present disclosure. It is apparent that the following embodiments are merely some embodiments of the present disclosure rather than all embodiments of the present disclosure. According to the embodiments in the present disclosure, all the other embodiments attainable by those skilled in the art without creative endeavor belong to the protection scope of the present disclosure.

Figure 4:
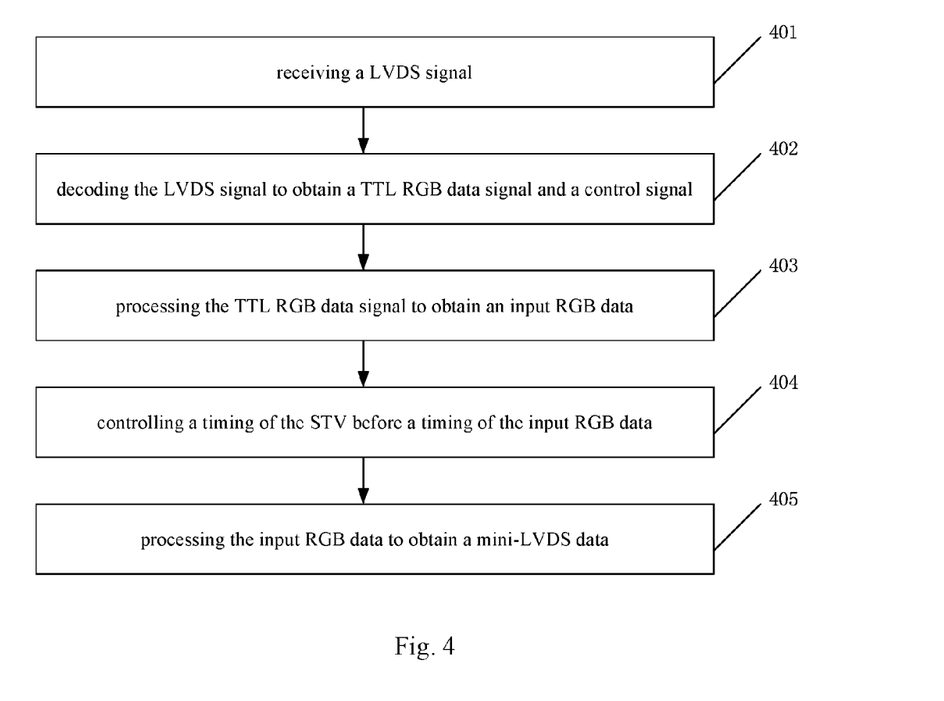
FIG. 4 is a flowchart of a method for controlling a message signal within a timing controller integrated circuit according to a first embodiment of the present disclosure.

Please refers to FIG. 4. FIG. 4 is a flowchart of a method for controlling a message signal within a timing controller integrated circuit according to a first embodiment of the present disclosure. The method may be performed by the timing controller integrated circuit (TCON IC), and the TCON IC may be disposed within a display panel or a display device. As shown in FIG. 4, the method includes the following steps.

Step S401: receiving a low voltage differential signaling signal (LVDS signal).

In the above step S401, the step of receiving the LVDS signal may be received by a low voltage differential signaling (LVDS) receiver, but the first embodiment of the present disclosure does not limit a manner of receiving the signal by the LVDS receiver. The LVDS signal has two modes, and the two modes may be divided into: a synchronization mode or an enabling mode (DE mode).

A specific receiving manner and a specific structure of the LVDS receiver may adopt a signal receiving manner of the prior art, but the first embodiment of the present disclosure does not limit the signal receiving manner and the specific structure of the LVDS receiver.

Step S402: decoding the LVDS signal to obtain a transistor-transistor logic (TTL) RGB data signal and a control signal.

In the above step S402, the step of decoding the LVDS signal to obtain the TTL RGB data signal and the control signal may also achieved by the LVDS receiver. The specific decoding process manner of the LVDS receiver may adopt a decoding process manner of the prior art, such as the LVDS signal is re-arranged to obtain the TTL RGB data signal. The first embodiment of the present disclosure may adopt any one or more process manner of the prior art for decoding the LVDS signal to obtain the TTL RGB data signal and a control signal, but the first embodiment of the present disclosure does not limit the specific form of the above process manner.

In the above step S402, the control signal may include: a start signal (STV), a data enable (DE), a horizontal synchronization (Hsync) and a vertical synchronization (Vsync) and the control signal may be generated by the TCON IC.

Step S403: processing the TTL RGB data signal to obtain an input RGB data.

In the above step S403, the step of processing the TTL RGB data signal to obtain an input RGB data may have a variety of methods. The first embodiment of the present disclosure may adopt any one or more process manner of the prior art for processing the TTL RGB data signal to obtain an input RGB data, but the first embodiment of the present disclosure does not limit the specific form of the above process manner.

Step S404: controlling a timing of the STV before a timing of the input RGB data.

In the above step S404, the generation of the STV may be achieved by the TCON IC, and the TCON IC needs controlling the timing of the STV before the timing of the input RGB data. The step of controlling the timing of the STV before the timing of the input RGB data may have a variety of implementation manner, but the first embodiment of the present disclosure does not limit the specific form of the above timing controlling implementation manner.

Step S405: processing the input RGB data to obtain a mini-low voltage differential signaling data (mini-LVDS data).

In the above step S405, a format of the input RGB data may be a data with TTL format, and a format of the mini-LVDS data may be a data with LVDS format. The process manner may perform the data arrangement for the input RGB data to obtain the mini-LVDS data.

Figure 3:
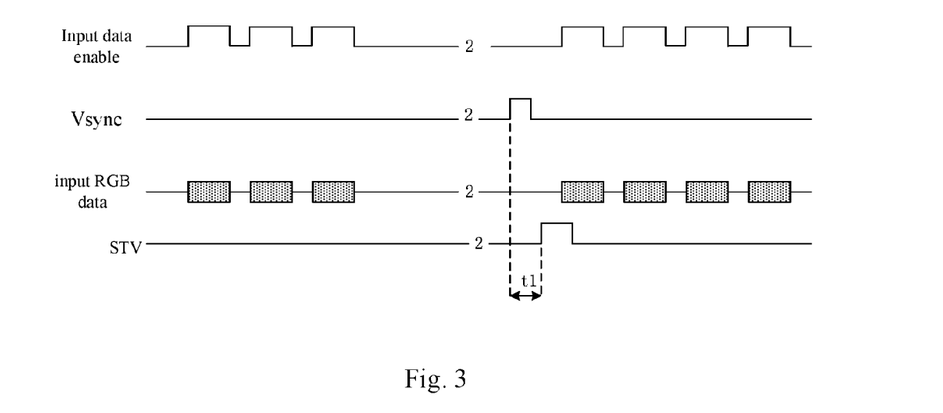
FIG. 3 is a schematic view of a signal timing with a timing controller integrated circuit according to an embodiment of the present disclosure.
Figure 5:
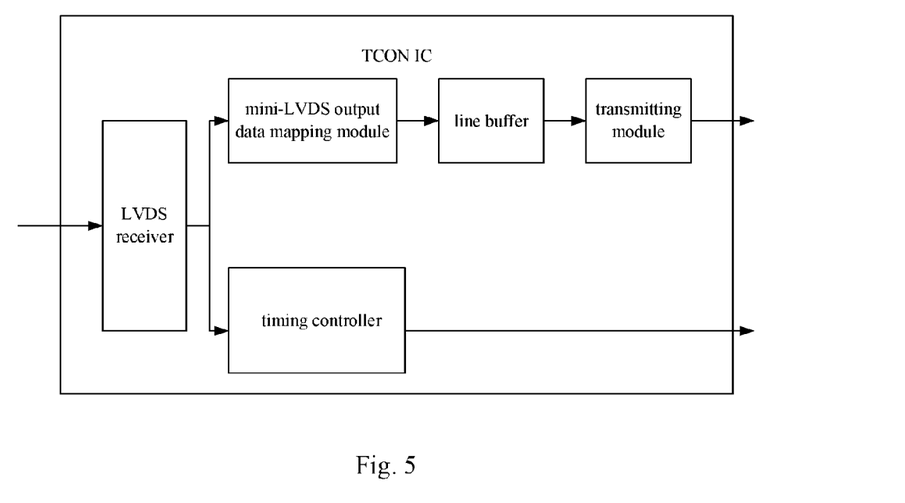
FIG. 5 is a structure schematic view of a timing controller integrated circuit in the prior art.

The technical scheme provided by the first embodiment of the present disclosure may set the timing of the STV, such that the timing of the STV is before the input RGB data, thus it is capable of avoiding the input RGB data lost by the TCON IC due to the timing of the STV. Please refers to FIG. 2 and FIG. 5. FIG. 2 is a schematic view of a signal timing within a timing controller integrated circuit in the prior art, and FIG. 5 is a structure schematic view of a timing controller integrated circuit in the prior art. The TCON IC includes: a LVDS receiver, a mini-LVDS output data mapping module, a line buffer, a transmitting module and a timing controller. As shown in FIG. 2, input DE may be an inputted enable signal, input RGB data may be a RGB data inputted by the line buffer within the TCON IC, output RGB data may be a RGB data outputted by the line buffer within the TCON IC, STV is one start signal produced or generated within the TCON IC, an action of the STV is after the timing of the STV, the TCON IC may process the input RGB data. Assuming that the timing of the input RGB data is before the timing of the STV, thus the input RGB data before the timing of the STV may be lost or may not process, thereby affecting the data receiving of the display screen and affecting the display effect thereof. The prior art delays a time t2 for the input RGB data through the line buffer to obtain the output RGB data (i.e. the storage data of the line buffer), then delays a time t3 for the timing of the STV based on a timing of the input DE to control t3<t2, thereby achieving the timing of the STV set before the timing of the output RGB data, as shown in FIG. 3. In FIG. 3, Vsync may be a vertical synchronization signal of the TCON IC. Such setting is to prevent the loss of the input RGB data, but this setting needs disposing one buffer, i.e. the line buffer is used to store the delayed data, such as the output RGB data. In the technical scheme adopted by the first embodiment of the present disclosure, when the STV is generated, the timing of the STV is directly controlled before the timing of the input RGB data, thus it does not need the buffer. For the TCON IC of the first embodiment of the present disclosure, the timing of the STV is already controlled before the timing of the input RGB data, thus the TCON IC already directly process the input RGB data, and the loss or untreated situation of the input RGB data may not occur. Therefore, the first embodiment of the present disclosure does not need delaying for the input RGB data, thus the liner buffer may be saved, so as to decrease the cost.

In the technical scheme provided by the first embodiment of the present disclosure, the LVDS signal is received, the LVDS signal is decoded to obtain the TTL logic RGB data signal and the control signal, the STV is generated, and the timing of the STV is controlled before the timing of the input RGB data, the TTL RGB data signal is processed to obtain the input RGB data, and the input RGB data is processed to obtain the mini-LVDS data. The data process directly processes the input RGB data, thus it does not delay for the input RGB data and does not need the line buffer. Therefore, the line buffer is saved, so as to decrease the cost.

Figure 6:
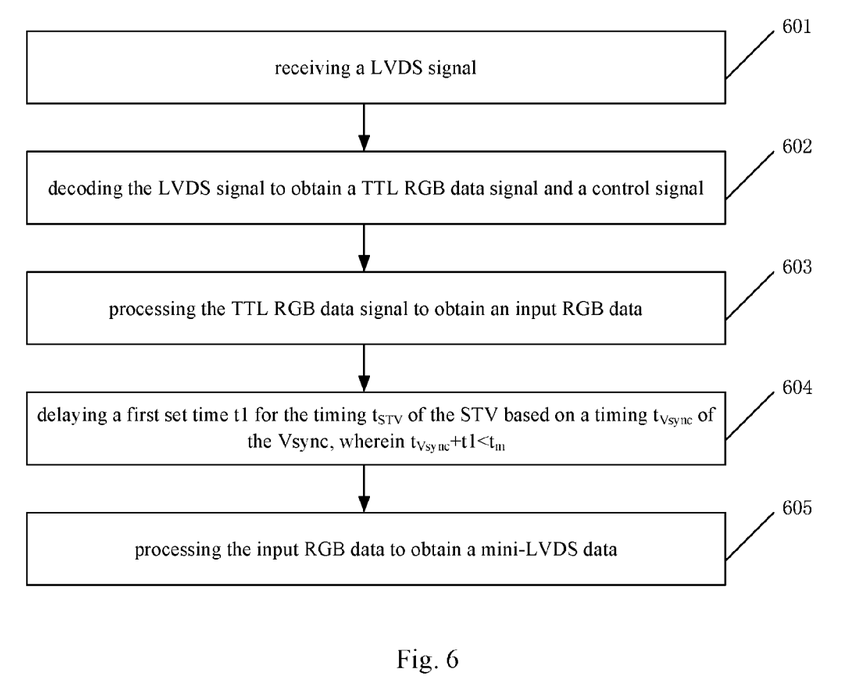
FIG. 6 is a flowchart of a method for controlling a message signal within a timing controller integrated circuit according to a second embodiment of the present disclosure.

Please refers to FIG. 6. FIG. 6 is a flowchart of a method for controlling a message signal within a timing controller integrated circuit according to a second embodiment of the present disclosure. The method may be performed by the timing controller integrated circuit (TCON IC), and the TCON IC may be disposed within a display panel or a display device. As shown in FIG. 6, the method includes the following steps.

Step S601: receiving a low voltage differential signaling signal (LVDS signal).

In the above step S601, the step of receiving the LVDS signal may be received by a low voltage differential signaling (LVDS) receiver, but the second embodiment of the present disclosure does not limit a manner of receiving the signal by the LVDS receiver. The LVDS signal has two modes, and the two modes may be divided into: a synchronization mode or an enabling mode (DE mode).

A specific receiving manner and a specific structure of the LVDS receiver may adopt a signal receiving manner of the prior art, but the second embodiment of the present disclosure does not limit the signal receiving manner and the specific structure of the LVDS receiver.

Step S602: decoding the LVDS signal to obtain a TTL RGB data signal and a control signal.

In the above step 602, the step of decoding the LVDS signal to obtain the TTL RGB data signal and the control signal may also achieved by the LVDS receiver. The specific decoding process manner of the LVDS receiver may adopt a decoding process manner of the prior art, such as the LVDS signal is re-arranged to obtain the TTL RGB data signal. The second embodiment of the present disclosure may adopt any one or more process manner of the prior art for decoding the LVDS signal to obtain the TTL RGB data signal and a control signal, but the second embodiment of the present disclosure does not limit the specific form of the above process manner.

In the above step 602, the control signal may include: a start signal (STV), a data enable (DE), a horizontal synchronization (Hsync) and a vertical synchronization (Vsync) and the control signal may be generated by the TCON IC.

Step S603: processing the TTL RGB data signal to obtain an input RGB data.

In the above step S603, the step of processing the TTL RGB data signal to obtain an input RGB data may have a variety of methods. The second embodiment of the present disclosure may adopt any one or more process manner of the prior art for processing the TTL RGB data signal to obtain an input RGB data, but the first embodiment of the present disclosure does not limit the specific form of the above process manner.

Step 604: delaying a first set time t1 for the timing tSTV of the STV based on a timing tVsync of the Vsync, wherein tVsync+t1<tm.

In the above step 604, the generation of the STV may be achieved by the TCON IC, and the TCON IC needs delaying the first set time t1 for the timing tSTV of the STV based on the timing tVsync of the Vsync, wherein tVsync+t1<tm, and tm may be the timing of the input RGB data.

Step S605: processing the input RGB data to obtain a mini-low voltage differential signaling data (mini-LVDS data).

The technical scheme provided by the second embodiment of the present disclosure may set the timing of the STV, such that the timing of the STV is before the input RGB data, thus it is capable of avoiding the input RGB data lost by the TCON IC due to the timing of the STV. Please refers to FIG. 2 and FIG. 5. FIG. 2 is a schematic view of a signal timing within a timing controller integrated circuit in the prior art, and FIG. 5 is a structure schematic view of a timing controller integrated circuit in the prior art. The TCON IC includes: a LVDS receiver, a mini-LVDS output data mapping module, a line buffer, a transmitting module and a timing controller. As shown in FIG. 2, input DE may be an inputted enable signal, input RGB data may be a RGB data inputted by the line buffer within the TCON IC, output RGB data may be a RGB data outputted by the line buffer within the TCON IC, STV is one start signal produced or generated within the TCON IC, an action of the STV is after the timing of the STV, the TCON IC may process the input RGB data. Assuming that the timing of the input RGB data is before the timing of the STV, thus the input RGB data before the timing of the STV may be lost or may not process, thereby affecting the data receiving of the display screen and affecting the display effect thereof. The prior art delays a time t2 for the input RGB data through the line buffer to obtain the output RGB data (i.e. the storage data of the line buffer), then delays a time t3 for the timing of the STV based on a timing of the input DE to control t3<t2, thereby achieving the timing of the STV set before the timing of the output RGB data, as shown in FIG. 3. In FIG. 3, Vsync may be a vertical synchronization signal of the TCON IC. Such setting is to prevent the loss of the input RGB data, but this setting needs disposing one buffer, i.e. the line buffer is used to store the delayed data, such as the output RGB data. In the technical scheme adopted by the first embodiment of the present disclosure, when the STV is generated, the timing of the STV is directly controlled before the timing of the input RGB data, thus it does not need the buffer. For the TCON IC of the first embodiment of the present disclosure, the timing of the STV is already controlled before the timing of the input RGB data, thus the TCON IC already directly process the input RGB data, and the loss or untreated situation of the input RGB data may not occur. Therefore, the second embodiment of the present disclosure does not need delaying for the input RGB data, thus the liner buffer may be saved, so as to decrease the cost.

Figure 7:
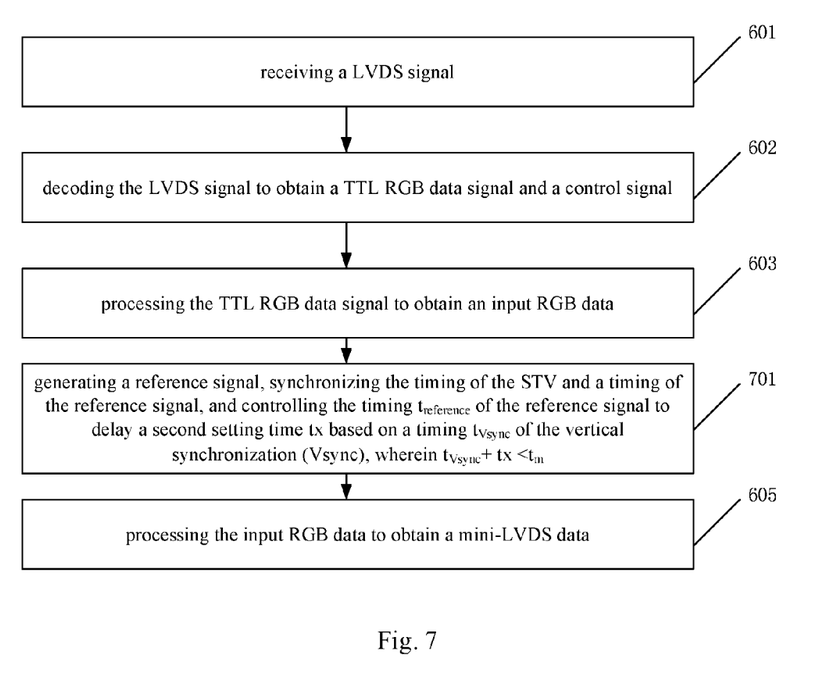
FIG. 7 is a flowchart of an optional method according to the second embodiment of the present disclosure.

Optionally, the step S604 of the second embodiment of the present disclosure may also replaced by the following step, as shown in FIG. 7.

Step S701: generating a reference signal, synchronizing the timing of the STV and a timing of the reference signal, and controlling the timing treference of the reference signal to delay a second setting time tx based on a timing tVsync of the vertical synchronization (Vsync), wherein tVsync+tx<tm.

In the above step S701, the generation of the STV and the reference signal may be achieved by the TCON IC, and the TCON IC needs controlling the timing treference of the reference signal to delay the second setting time tx based on the timing tVsync of the Vsync, wherein tVsync+tx<tm, and tm is the timing of the input RGB data. The disadvantage of this manner is that it further needs generating a reference signal, thereby increasing the computation of TCON IC.

Figure 8:
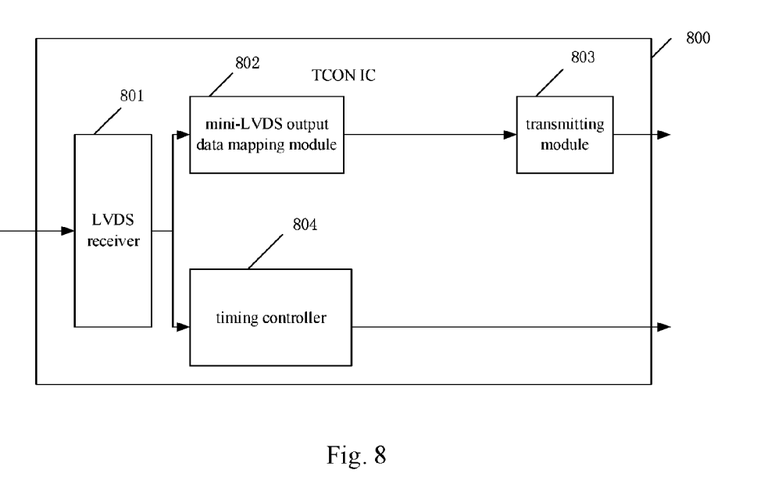
FIG. 8 is a structure schematic view of a timing controller integrated circuit according to a third embodiment of the present disclosure.

Please refers to FIG. 8. FIG. 8 is a structure schematic view of a timing controller integrated circuit (TCON IC) according to a third embodiment of the present disclosure. The TCON IC 800 includes: a low voltage differential signaling (LVDS) receiver 801, a mini-low voltage differential signaling (mini-LVDS) output data mapping module 802, a transmitting module 803 and a timing controller 804.

the LVDS receiver 801 is used to receive a LVDS signal, decode the LVDS signal to obtain a TTL RGB data signal and a control signal, wherein the control signal includes: a start signal (STV), a horizontal synchronization (Hsync) and a vertical synchronization (Vsync), and transmit the TTL RGB data signal to the mini-LVDS output data mapping module 802 and transmit the control signal to the timing controller 804.

The third embodiment of the present disclosure does not limit a manner of receiving the signal by the LVDS receiver. The LVDS signal has two modes, and the two modes may be divided into: a synchronization mode or an enabling mode (DE mode).

The mini-LVDS output data mapping module 802 is used to process the TTL RGB data signal to obtain an input RGB data and transmits the input RGB data to the transmitting module 803.

In the mini-LVDS output data mapping module 802, the method of processing the TTL RGB data signal to obtain an input RGB data may have a variety of methods. The third embodiment of the present disclosure may adopt any one or more process manner of the prior art for processing the TTL RGB data signal to obtain an input RGB data, but the third embodiment of the present disclosure does not limit the specific form of the above process manner.

The timing controller 804 is used to control a timing of the STV before a timing of the input RGB data.

In the timing controller 804, the generation of the STV may be achieved by the TCON IC, and the TCON IC needs controlling the timing of the STV before the timing of the input RGB data. The step of controlling the timing of the STV before the timing of the input RGB data may have a variety of implementation manner, but the third embodiment of the present disclosure does not limit the specific form of the above timing controlling implementation manner.

The transmitting module 803 is used to process the input RGB data to obtain a mini-low voltage differential signaling data (mini-LVDS data).

In the transmitting module 803, a format of the input RGB data may be a data with TTL format, and a format of the mini-LVDS data may be a data with LVDS format. The process manner may perform the data arrangement for the input RGB data to obtain the mini-LVDS data.

The technical scheme provided by the third embodiment of the present disclosure may set the timing of the STV, such that the timing of the STV is before the input RGB data, thus it is capable of avoiding the input RGB data lost by the TCON IC due to the timing of the STV. Please refers to FIG. 2 and FIG. 5. FIG. 2 is a schematic view of a signal timing within a timing controller integrated circuit in the prior art, and FIG. 5 is a structure schematic view of a timing controller integrated circuit in the prior art. The TCON IC includes: a LVDS receiver, a mini-LVDS output data mapping module, a line buffer, a transmitting module and a timing controller. As shown in FIG. 2, input DE may be an inputted enable signal, input RGB data may be a RGB data inputted by the line buffer within the TCON IC, output RGB data may be a RGB data outputted by the line buffer within the TCON IC, STV is one start signal produced or generated within the TCON IC, an action of the STV is after the timing of the STV, the TCON IC may process the input RGB data. Assuming that the timing of the input RGB data is before the timing of the STV, thus the input RGB data before the timing of the STV may be lost or may not process, thereby affecting the data receiving of the display screen and affecting the display effect thereof. The prior art delays a time t2 for the input RGB data through the line buffer to obtain the output RGB data (i.e. the storage data of the line buffer), then delays a time t3 for the timing of the STV based on a timing of the input DE to control t3<t2, thereby achieving the timing of the STV set before the timing of the output RGB data, as shown in FIG. 3. In FIG. 3, Vsync may be a vertical synchronization signal of the TCON IC. Such setting is to prevent the loss of the input RGB data, but this setting needs disposing one buffer, i.e. the line buffer is used to store the delayed data, such as the output RGB data. In the technical scheme adopted by the first embodiment of the present disclosure, when the STV is generated, the timing of the STV is directly controlled before the timing of the input RGB data, thus it does not need the buffer. For the TCON IC of the first embodiment of the present disclosure, the timing of the STV is already controlled before the timing of the input RGB data, thus the TCON IC already directly process the input RGB data, and the loss or untreated situation of the input RGB data may not occur. Therefore, the third embodiment of the present disclosure does not need delaying for the input RGB data, thus the liner buffer may be saved, so as to decrease the cost.

In the technical scheme provided by the third embodiment of the present disclosure, the LVDS signal is received, the LVDS signal is decoded to obtain the TTL logic RGB data signal and the control signal, the STV is generated, and the timing of the STV is controlled before the timing of the input RGB data, the TTL RGB data signal is processed to obtain the input RGB data, and the input RGB data is processed to obtain the mini-LVDS data. The data process directly processes the input RGB data, thus it does not delay for the input RGB data and does not need the line buffer. Therefore, the line buffer is saved, so as to decrease the cost.

Optionally, the timing controller 804 may be used to delay a first set time t1 for the timing tSTV of the start signal based on a timing tVsync of the Vsync, wherein tVsync+t1<tm, and tm is the timing of the input RGB data.

In the above timing controller 804, the generation of the STV may be achieved by the TCON IC, and the TCON IC needs delaying the first set time t1 for the timing tSTV of the STV based on the timing tVsync of the Vsync, wherein tVsync+t1<tm, and tm may be the timing of the input RGB data.

Optionally, the timing controller 804 may be used to generate a reference signal, synchronize the timing of the start signal and a timing of the reference signal, and control the timing treference of the reference signal to delay a second set time tx based on a timing tVsync of the Vsync, wherein tVsync+tx<tm, and tm is the timing of the input RGB data.

Figure 9:
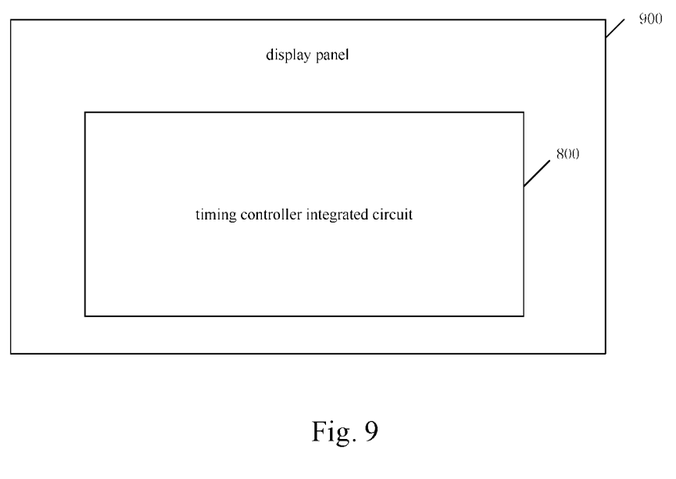
FIG. 9 is a structure schematic view of a display panel according to an embodiment of the present disclosure.

Please refers to FIG. 9. FIG. 9 is a structure schematic view of a display panel according to an embodiment of the present disclosure. The display panel includes a timing controller integrated circuit 800, and a structure of the timing controller integrated circuit 800 may refer to a structure provided by the third embodiment of the present disclosure.

In addition, one embodiment of the present disclosure further provides a display device, the display device may include a display panel and the display panel may include the above time controller integrated circuit. A structure of the timing controller integrated circuit 800 may refer to a structure provided by the third embodiment of the present disclosure.

The above present disclosure is merely an embodiment of the present disclosure and does not intend to limit the claim scope of the present disclosure. Those having ordinary knowledge in the related art may realize all or part of the process to achieve the above embodiments and may conduct equivalent variation on the claims of the present disclosure, which belongs to the scope covered by the present disclosure.

What is claimed is:

1. A method for controlling a message signal within a timing controller integrated circuit, comprising:
   receiving a low voltage differential signaling signal;
   decoding the low voltage differential signaling signal to obtain a transistor-transistor logic RGB data signal and a control signal, wherein the control signal comprises: a start signal, a horizontal synchronization and a vertical synchronization;
   processing the transistor-transistor logic RGB data signal to obtain an input RGB data;
   controlling a timing of the start signal before a timing of the input RGB data;
   processing the input RGB data to obtain a mini-low voltage differential signaling data; and
   wherein before the step of controlling the timing of the start signal before a timing of the mini-low voltage differential signaling data comprises:
   delaying a first set time t1 for the timing of the start signal based on a timing $t_{Vsync}$ of the vertical synchronization, wherein $t_{Vsync}+t1<t_m$, and $t_m$ is the timing of the input RGB data.

2. The method according to claim 1, wherein a mode of the low voltage differential signaling signal is:
   a synchronization mode or an enabling mode.

3. A method for controlling a message signal within a timing controller integrated circuit, comprising:
   receiving a low voltage differential signaling signal;
   decoding the low voltage differential signaling signal to obtain a transistor-transistor logic RGB data signal and a control signal, wherein the control signal comprises: a start signal, a horizontal synchronization and a vertical synchronization;
   processing the transistor-transistor logic RGB data signal to obtain an input RGB data;
   controlling a timing of the start signal before a timing of the input RGB data;
   processing the input RGB data to obtain a mini-low voltage differential signaling data; and
   wherein before the step of controlling the timing of the start signal before the timing of the input RGB data comprises:
   generating a reference signal, synchronizing the timing of the start signal and a timing of the reference signal, and controlling the timing $t_{reference}$ of the reference signal to delay a second setting time tx based on a timing $t_{Vsync}$ of the vertical synchronization, wherein $t_{Vsync}+tx<t_m$, and $t_m$ is the timing of the input RGB data.

4. A timing controller integrated circuit, wherein the timing controller integrated circuit comprises a low voltage differential signaling receiver, a mini-low voltage differential signaling output data mapping module, a transmitting module and a timing controller;

wherein the low voltage differential signaling receiver is used to receive a low voltage differential signaling signal, decode the low voltage differential signaling signal to obtain a transistor-transistor logic RGB data signal and a control signal, wherein the control signal comprises: a start signal, a horizontal synchronization and a vertical synchronization, and transmit the transistor-transistor logic RGB data signal to the mini-low voltage differential signaling output data mapping module and transmit the control signal to the timing controller;

wherein the mini-low voltage differential signaling output data mapping module is used to process the transistor-transistor logic RGB data signal to obtain a input RGB data and transmits the input RGB data to the transmitting module;

wherein the timing controller is used to control a timing of the start signal before a timing of the input RGB data; and     wherein the transmitting module is used to process the input RGB data to obtain a mini-low voltage differential signaling data; and     wherein the timing controller is used to delay a first set time t1 for the timing of the start signal based on a timing $t_{Vsync}$ of the vertical synchronization, wherein $t_{Vsync}+t1<t_m$, and $t_m$ is the timing of the input RGB data.

5. The timing controller integrated circuit according to claim 4, wherein a mode of the low voltage differential signaling signal is:

a synchronization mode or an enabling mode.

6. A display panel, wherein the display panel comprises the timing controller integrated circuit according to claim 4.

7. A display device, wherein the display device comprises the display panel according to claim 6.

8. A timing controller integrated circuit, wherein the timing controller integrated circuit comprises a low voltage differential signaling receiver, a mini-low voltage differential signaling output data mapping module, a transmitting module and a timing controller;

wherein the low voltage differential signaling receiver is used to receive a low voltage differential signaling signal, decode the low voltage differential signaling signal to obtain a transistor-transistor logic RGB data signal and a control signal, wherein the control signal comprises: a start signal, a horizontal synchronization and a vertical synchronization, and transmit the transistor-transistor logic RGB data signal to the mini-low voltage differential signaling output data mapping module and transmit the control signal to the timing controller;

wherein the mini-low voltage differential signaling output data mapping module is used to process the transistor-transistor logic RGB data signal to obtain a input RGB data and transmits the input RGB data to the transmitting module;

wherein the timing controller is used to control a timing of the start signal before a timing of the input RGB data;

wherein the transmitting module is used to process the input RGB data to obtain a mini-low voltage differential signaling data; and     wherein the timing controller is used to generate a reference signal, synchronize the timing of the start signal and a timing of the reference signal, and control the timing $t_{reference}$ of the reference signal to delay a second set time tx based on a timing $t_{Vsync}$ of the vertical synchronization, wherein $t_{Vsync}+tx<t_m$, and $t_m$ is the timing of the input RGB data.

\* \* \* \* \*